United States Patent [19]

Hansen

[11] Patent Number: 4,653,102

[45] Date of Patent: Mar. 24, 1987

[54] DIRECTIONAL MICROPHONE SYSTEM

[75] Inventor: Per K. Hansen, Burlington, Vt.

[73] Assignee: Position Orientation Systems, Burlington, Vt.

[21] Appl. No.: 795,172

[22] Filed: Nov. 5, 1985

[51] Int. Cl.[4] .......................... H04B 1/06; H04M 1/20

[52] U.S. Cl. .......................................... 381/92; 381/94; 381/47

[58] Field of Search .............................. 381/92, 94, 47

[56] References Cited

U.S. PATENT DOCUMENTS

| | | | |
|---|---|---|---|
| 3,440,350 | 4/1969 | Flanagan | 381/47 |
| 3,662,108 | 5/1972 | Flanagan | 381/47 |
| 4,063,031 | 12/1977 | Grunza | 381/47 |
| 4,485,484 | 11/1984 | Flanagan | 381/92 |
| 4,536,887 | 8/1985 | Kaneda | 381/94 |
| 4,559,642 | 12/1985 | Miyaji | 381/92 |
| 4,589,137 | 5/1986 | Miller | 381/92 |

FOREIGN PATENT DOCUMENTS

| | | | |
|---|---|---|---|
| 5565914 | 4/1982 | Japan | 381/94 |
| 1156126 | 5/1985 | U.S.S.R. | 381/47 |

*Primary Examiner*—Gene Z. Rubinson
*Assistant Examiner*—L. C. Schroeder
*Attorney, Agent, or Firm*—Sherman and Shalloway

[57] ABSTRACT

The present invention relates to an improved directional microphone system which utilizes at least two directional microphones. The microphones included in the system are connected to an electrical circuit which is programmed to cancel static noise and to facilitate dynamic gain control. The received signals from the two microphones are fed into a microcomputer where a fast Fourier transformation is made on the two signals in order to go from the time domain to the frequency domain. A lowpass and highpass filtering technique is used to cancel the dynamic noise. The frequency components of the incoming signals are further used to utilize an area and phase sorting technique to allow only the pickup of the wanted sound in a well-defined area. An inverse fast Fourier transformation is made and the modified signal is outputted in the time domain. Sounds generated from outside the work area are essentially cancelled out by a combination of the directionality of the microphones and the sorting techniques employed. The sorting techniques actually measure extraneous noises within the work area and compensate for them so as to enhance the signal-to-noise ratio for sounds generated within the work area. The improved directional microphone system is to be used at the table or on the floor, at a convenient distance from the user who can move freely in a well defined work area. The system eliminates the use of gooseneck and headset microphones, which are commonly used to achieve a high enough signal-to-noise ratio.

8 Claims, 24 Drawing Figures

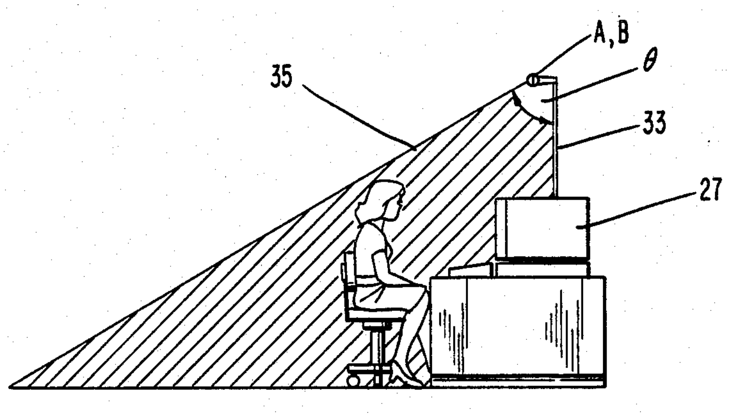
Fig. 4
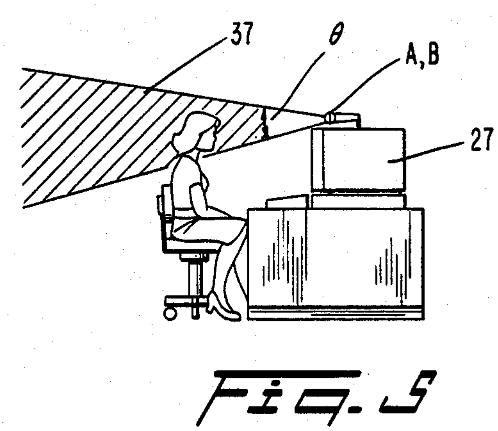
Fig. 5
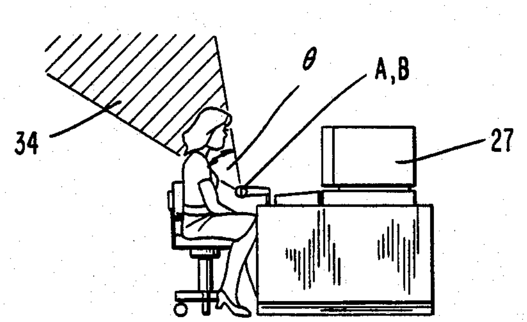
Fig. 6
Fig. 7
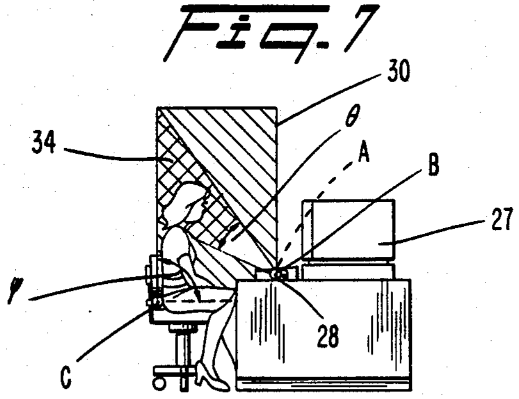

DIRECTIONAL MICROPHONE SYSTEM

BACKGROUND OF THE INVENTION

The present invention relates to an improved directional microphone system. In the prior art, various microphone designs are known including those which have an omnidirectional beam pattern and those having a unidirectional (cardioid) beam pattern. Such well known microphones have been known to be used in voice recognition systems and public announcement (PA) systems utilizing some noise cancellation techniques. While several different noise cancellation techniques are known in the prior art, none of these techniques is believed to be closely related to the teachings of the present invention.

The following prior art is known to Applicant:

U.S. Pat. No. 3,644,674 to Mitchell, et al. discloses an ambient noise suppressor including four microphones. The microphones are set up so that each one is the same distance from the talker. Since the talker is at equal distance from all microphones, any sounds which emanate from a source which are not equidistant from all microphones are cancelled out by the circuitry of the system. This is different from the teachings of the present invention since firstly, in the present invention, the speaker is not required to be located at equal distance from each of the microphones. Additionally, the present invention utilizes directional microphones which are not believed to be taught or suggested by Mitchell, et al. Other differences exist, such as the failure of this prior art reference to consider separate frequency components as the present invention does. More importantly, the Mitchell, et al. system does not totally cancel the noise source but only improves the signal-to-noise ratio without the use of a microprocessor whereas the present invention utilizes a microprocessor to cancel the noise rather than merely improving the signal-to-noise ratio.

U.S. Pat. No. 4,008,439 to Schroeder discloses a device for processing two noise contaminated substantially identical signals to improve the signal-to-noise ratio. As disclosed therein, the device includes a pair of input ports into which two noise contaminated substantially identical signals are inputted whereupon a cancellation technique is utilized to cancel noise. Again, the user of the system must be placed at equal distance from each of the microphones in order to produce substantially identical signals. Alternatively, the equal distance can also be adjusted by delay in one of the channels. The system uses weighting factors which continually change which is different from the teachings of the present invention. Further, many of the differences as set forth hereinabove regarding Mitchell, et al. are equally applicable here.

U.S. Pat. No. 4,155,041 to Burns, et al. discloses a system for reducing noise transients in identical electrical carrier signals. The signals are carried on separate channels and the device includes means for comparing the noise transients which occur in each channel and cause a carrier signal to be transmitted into the channel having the lowest noise transients. If the noise transient level exceeds a predetermined amount, the device further includes means for blanking out the excess noise. In the operation of this invention, a switching and a blanking step are sequentially employed. The present invention is believed to be distinct from the teachings of Burns, et al. because firstly , the Burns, et al. system does not use microphones nor does it pick up sound sources from a room. The system on the other hand is used for reproduction of already recorded sound signals which are fed into two separate channels whereupon further processing is made to eliminate extraneous noises such as, for example scratches in a record. Further, many of the differences cited with regard to the Mitchell, et al. invention are also equally applicable here. This discussion is also believed applicable to a further known U.S. Pat. No. 4,359,742 also to Burns, et al.

U.S. Pat. No. 4,420,655 to Suzuki discloses a system including two microphones which respectively receive signals and convey them to respective low pass filters whereupon a differential amplifier receives the filtered signals and then relays them to a further differential amplifier. The inventor claims to affect a compensation for the proximity effect. This system is distinct from the system of the present invention since in the present invention the user is restricted in the location of the microphones to be far enough away from the microphone so that in theory no proximity effect occurs. If desired, the present invention can also be operated so close to one of the microphones that a cancellation of the proximity effect must be made by a technique similar to the one described in this patent. Additionally, many of the differences set forth hereinabove regarding Mitchell, et al. are equally applicable herein.

U.S. Pat. No. 4,485,484 to Flanagan discloses a directional microphone system which arranges microphones so as to focus on a prescribed volume in a large room such as an auditorium. As disclosed, the system is designed to only accept signals which emanate from the prescribed volume and to reject any signals which are received from outside the prescribed volume. The system utilizes two microphone arrays wherein the first array is placed along a first wall and the second array is placed along a second wall or placed on the first wall spaced a predetermined distance from the first array. A separate position locator is employed which determines the position of the speaker. This invention is not ideal because due to phase interferences between the beam processed signals that occur if the microphone arrays are not equidistant from the talker location, resulting signals are not uniform in sensitivity for all points within the desired focal volume. The device further includes a signal adjuster which is adapted, to alter the phase characteristics of the signal applied thereto so that the terms $B_a$ and $B_b$ are equal. For the signal adjuster, a phase vocoder is used. The present invention is distinct from this system since the patented system uses a separate position locator whereas the present invention does not need to find the position of the speaker to effectively cancel out extraneous noises. Further, the patented system requires use of the microphone arrays including many microphones in each array whereas the present invention only uses two or three directional microphones. Additionally, the patented system uses dynamically controlled beams which result in dynamic changes in the received volume. Furthermore, the microprocessor is only used in the beam steering control and everything disclosed in this patent concerning the position locating, the dynamic beam steering (with lookup tables in memory), the microprocessor and the adjustment circuitry is unrelated to the teachings of the present invention.

U.S. Pat. No. 4,066,842 to Allen discloses a system utilizing an arrangement for reducing the effects of room reverberating and noise pickup in which signals from a pair of omnidirectional microphones are manipulated to develop a single less reverberant signal. This is accomplished by partitioning each microphone signal into preselected frequency components, co-phasing corresponding frequency components, adding the co-phased frequency component signals and attenuating these co-phased frequency components signals that are poorly correlated between the microphones. This system is vastly different from the teachings of the present invention for many reasons including the fact that the patented system uses omnidirectional microphones whereas the present invention utilizes directional microphones, the patented system looks at frequency components but only adjusts for phase differences, and further, in light of the same differences from the present invention as were evident regarding the above described Mitchell, et al. patent.

U.S. Pat. No. 4,131,760 to Coker discloses a system for determining the phase differences between the direct path signals of two microphones which system operatively aligns the two microphone signals to form a deverberated signal. Since this system only phase aligns the two microphone signals, it is believed to be of only general interest concerning the teachings of the present invention.

U.S. Pat. No. 2,736,771 to R. L. Hanson, et al. discloses a distant-talking telephone system where a pair of microphones are disposed side by side and facing the speaker in their normal position. After any desired amount of amplification, the outputs of the two incoming signals from the two microphones are added together, averaged and then passed through any desired transmission apparatus to outgoing telephone lines. A difference output is also derived, the individual outputs being preferably clipped beforehand. The difference output is applied as a control signal to vary the gain in the summed output transmission path. This system is vastly different from the teachings of the present invention for many reasons, including the fact that the patented system only averages the two incoming signals and uses the difference between the two incoming signals to control the averaging. Further, the same differences between the present invention and the patent to Mitchell, et al. as described above, apply here.

Applicant is also aware of several non-patent publications which are also believed to be of only general interest concerning the teachings of the present invention. A first category includes those which teach the use of multiple sensors in order to enhance the immunity of speech input to acoustic background noise. A two sensor configuration involving an accelerometer and a gradient microphone is described. A second configuration using one microphone for low frequencies and a second microphone for high frequencies is also described. These sensors are placed within 5 cm of the user's mouth. The system is only to be used with speech input. The systems are vastly different from the present invention since they do not look at frequency components and do not use any area cancellation scheme. Thus, the following publications are believed to be of only general interest concerning the teachings of the present invention.

"Multisensor Speech Input for Enhanced Immunity to Acoustic Background Noise", by V. R. Viswanathan, et al. presented at the *International Conferences on Acoustics, Speech and Signal Processing*, March 19–21, 1984, San Diego, Calif.;

"Noise-immune Speech Transduction Using Multiple Sensors", by V. R. Viswanathan, et al. presented at the *International Conference of Acoustics, Speech and Signal Processing*, March 26–29, 1985, Tampa, Fl.

Another catogory of publications includes those which teach specific details of directional microphones per se without disclosing details of systems using such directional microphones. Thus, a publication entitled "On the Use of Directional Microphones for Turbine Generator Sound Level Measurements," by A. P. Hribar, et al. IEEE Transactions on Power Apparatus and Systems, Volume PAS-98, #3, May/June, 1979, and publication entitled "The Quest for Directional Microphones at RCA," by H. F. Olson, *Journal of the Audio Engineering Society*, Volume 28, No. 11, Nov. 1980 and "Conference Microphone with Adjustable Directivity," by J. L. Flanagan, et al., Journal of Acoustical Society of America Volume 77, No 3, May 1985, are believed to be of only general interest concerning the present invention.

Another group of publications are those which disclose systems including circuitry for noise cancellation which systems utilize only one microphone. These systems are characterized by the use of predictive means for cancelling noise rather than means for measuring actual noise. Thus, the following publications are believed to be of only general interest concerning the teachings of the present invention:

"Adaptive Digital Techniques for Audio Noise Cancellation" by James E. Paul, *IEEE Circuits and System Magazine*, Volume CAS-1, No. 4, 1979;

"Frequency Domain Adaptive Noise Cancellation in Speech Signal" by Juan Carlos Ogue, et al. *Technology Reports*, Tohocu University, Volume 48, No. 2, 1983;

"Adaptive Noise Cancellation for a Class of Non-linear, Dynamic Reference Channels" by John C. Stapleton, et al., *IEEE. Transactions on Circuits and Systems*, Volume CAS-32, No. 2 Feb. 1985.

A further class of publications, one of which is known to Applicant, discloses a system for suppression of acoustic noise in speech utilizing two microphones wherein one of the microphones is exposed to the signal and noise whereas the other microphone is exposed only to noise, and noise compensation is thereby accomplished. The following publication, which is accordingly believed to be of only general interest regarding the teachings of the present invention, is known to Applicant:

"Suppression of Acoustic Noise in Speech Using Two Microphones Adaptive Noise Cancellation" by Steven F. Boll, et al., *IEEE Transactions on Acoustics, Speech and Signal Processing*, Volume ASSP-28, No. 6, December, 1980.

Thus, a need has developed for an improved directional microphone system which may utilize two or three specially designed directional microphones and which further includes circuitry specifically designed to cancel noise within a predetermined work area by actually measuring the noise and eliminating it. From this perspective, the present invention was developed.

SUMMARY OF THE INVENTION

The present invention was developed so as to overcome the deficiencies evident in prior art devices as described hereinabove and in fact provides an integrated improved directional microphone system which measures actual noise and processes sounds captured by a plurality of directional microphones located within a predetermined space, analyzes these sounds as captured and processes the sounds so as to effectively eliminate all extraneous noises either within the predetermined area or outside this area. The present invention includes the following structure, aspects and features:

(a) In a first aspect of the present invention, two or three directional microphones are used and are carefully placed within a predetermined area.

(b) The microphones are placed in such a manner that the areas from which they may receive sound due to the directional nature thereof overlap so as to create the predetermined work area described above. The specific description of the preferred embodiments will describe several options for microphone placement for different results and effects.

(c) The system also includes circuitry for cancelling static noise. This is accomplished by measuring the received signal level immediately after the system is turned on which signal is indicative of static noise in the system. If the signal level is changing less than a predetermined level for a predetermined time, this level is then indicative of the static noise in the system. This is a quite effective system of static noise cancellation since it uses measurements from at least two microphones to set the static noise level.

(d) The microphones are connected to an electrical circuit which processes the soundwaves received thereby through the use of frequency components. This is accomplished by making a fast Fourier transform of each of the electrical signals received from the microphones.

(e) The system is also designed to cancel dynamic noise by measuring the incoming signals in a frequency range outside the audible frequency range through the use of filter manipulation after a fast Fourier transformation. In this way, the average of the amplitude level of the signal in this frequency range is then found and used to estimate the amplitude level of the frequency components of the noise sources in the audible frequency range. Since at least two microphones are utilized in this dynamic noise cancellation technique, it is an effective means for dynamic noise cancellation.

(f) In one aspect of the present invention, the circuitry is designed so as to cancel out noise or sound coming from the area outside the work area. In this aspect, signal levels are compared for each frequency and the frequencies which are not present in both signals are cancelled from both signals. Then the most common amplitude difference between the two signals is used to compensate the signals from phase shifts resulting from the user being placed at unequal distance from the microphones.

(g) The system also utilizes a dynamic gain control in order to adjust the gain so that the signal will be in a preset amplitude range to thereby enhance the signal-to-noise ratio. This is only done when the improvements described above have already been done.

Accordingly, it is a first object of the present invention to provide an improved directional microphone system.

It is a further object of the present invention to provide such a system wherein two or three microphones are set up with their beam patterns intersecting so as to prescribe a specific predetermined work area.

It is a still further object of the present invention to provide such a system wherein unwanted noise is actually measured rather than estimated or simulated and such unwanted noise is effectively cancelled from within or without the predetermined work area.

It is a still further object of the present invention to provide such a system wherein the user thereof may move around freely in the work area while the system works to eliminate unwanted noises wherever the user is within the work area.

These and other objects, aspects and features of the present invention will be better understood from the following detailed description of the preferred embodiments when read in conjunction with the appended drawing figures.

BRIEF DESCRIPTION OF THE DRAWINGS

FIGS. 4, 5 and 6 show three embodiments of vertical microphone placement schemes.

FIG. 7 shows a microphone placement scheme wherein three microphones are used.

FIG. 8 shows a block diagram of an embodiment of the present invention utilizing three microphones.

FIGS. **9*a*–9*c* show flow charts of the procedure for operating the system of FIG. 8**, when only utilizing two microphones.

FIGS. **10*a*–10*d*** show graphs of voltage versus time to explain the aspect of the present invention involving cancelation of static noise.

FIGS. **11*a* and 11*b*** show graphs of voltage versus frequency for an incoming signal and an adjusted signal arrived at through the use of an aspect of the present invention involving dynamic noise cancellation.

FIGS. **12*a*–12*d*** show graphs of amplitude versus frequency to show the use of the area frequency cancellation scheme.

FIGS. **13*a*–13*c* show respective graphs of amplitude versus frequency of the difference between the two signals from FIG. 12**. It further shows the two modified signals as arrived at through the use of the amplitude difference of the frequency components cancellation scheme.

DETAILED DESCRIPTION OF THE PREFERRED EMBODIMENTS

Figure 1:
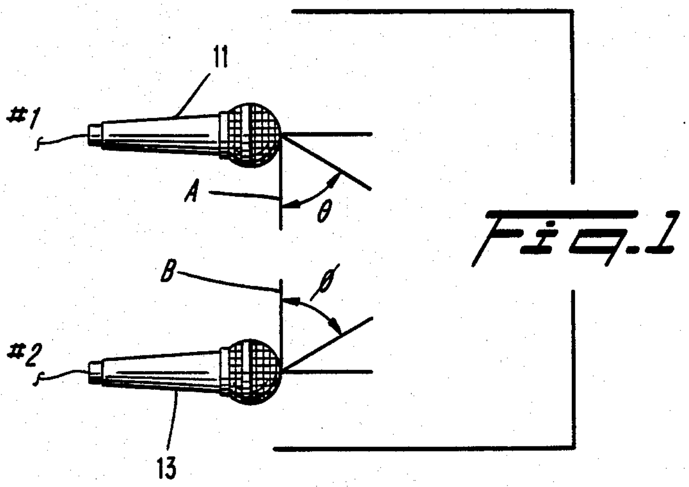
FIG. 1 shows a horizontal schematic view of two directional microphones for use in the present invention.

With reference to FIG. 1, an example of two microphones schematically aligned to form overlapping beam patterns is shown. The microphones 11 and 13, which are directional microphones, have beam patterns defined by respective lines A and B extending perpendicularly to the respective longitudinal axis x and y thereof. This gives microphone 11 an effective 3 dB beamwidth of $\theta$ and microphone 13 and effective 3 dB beamwidth of $\phi$.

Figure 2:
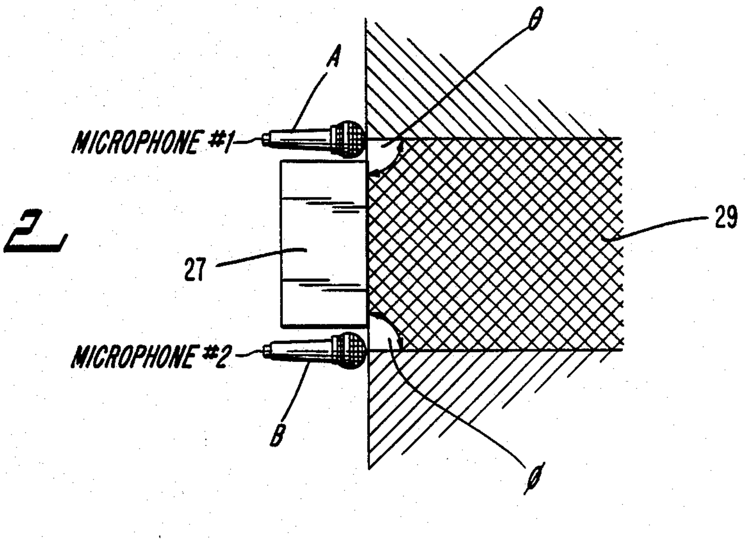
FIG. 2 shows a first horizontal microphone placement scheme.
Figure 3:
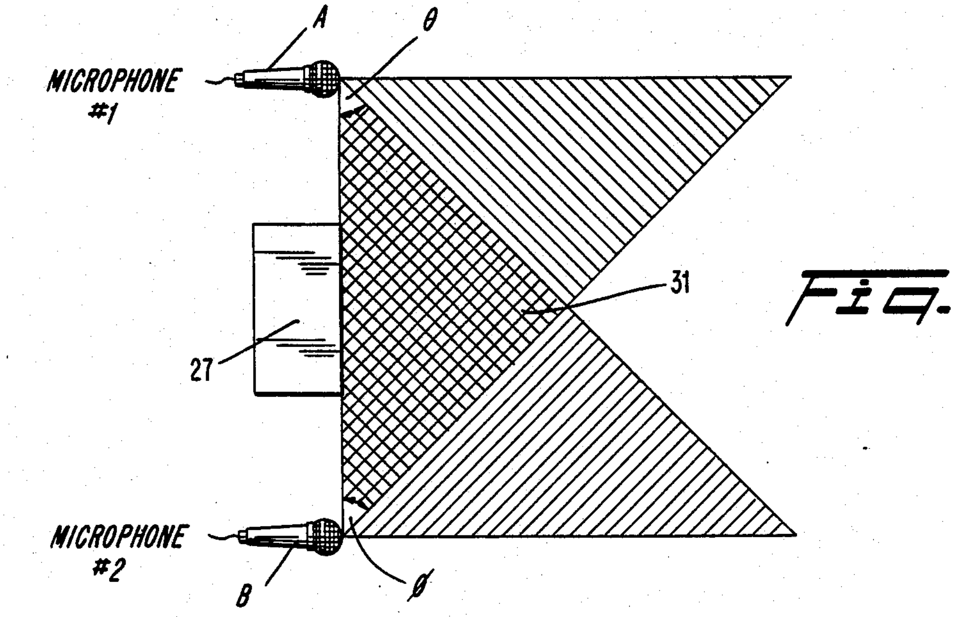
FIG. 3 shows a second horizontal microphone placement scheme.

FIGS. 2 and 3 show different configurations of microphone placement in the horizontal plane. FIG. 2 shows the microphones A and B placed immediately adjacent to the operating computer 27. When so placed, a work area 29 related to the overlap of the beam patterns of the microphones A and B is created. Microphone A has a 3 dB beamwidth of $\theta=90$ degrees and microphone B has a 3 dB beamwidth of $\phi=90$ degrees. In FIG. 3, the microphones A and B are placed some distance away from the computer 27, thereby resulting in a differently shaped work area 31 caused by the overlap between the beam patterns of the microphones A and B. Microphone A has a 3 dB beamwidth of $\theta=60$ degrees and microphone B has a 3 dB beamwidth of $\phi=60$ degrees.

Figure 6:
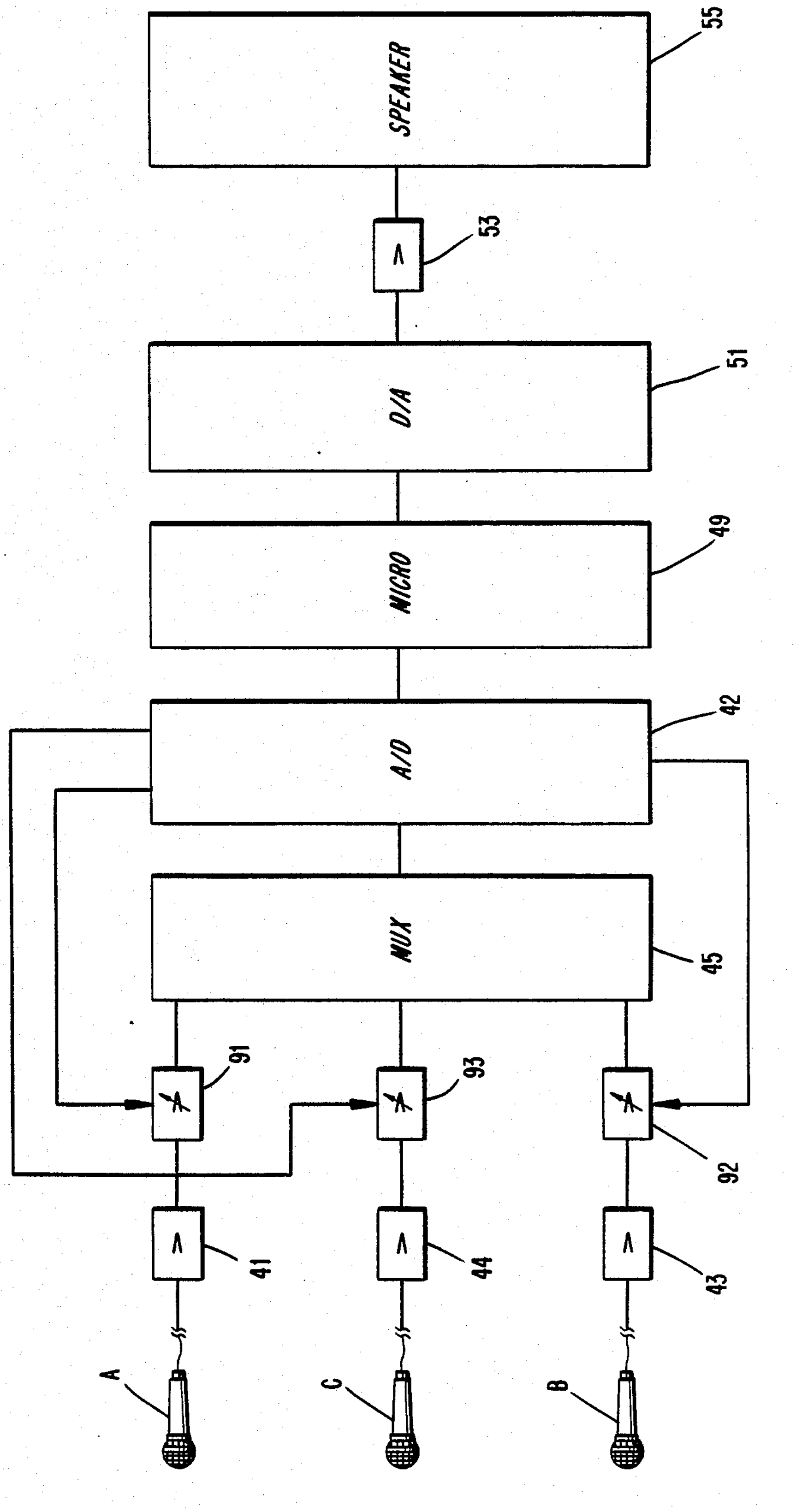

FIGS. 4, 5 and 6 show different arrangements for placement of microphones in the vertical direction. Thus, FIG. 4 shows the computer 27 having a pedestal 33 extending upwardly therefrom on which are mounted the microphones A, B. Such placement results in the work area 35 being created with respect to the user. Microphone A has a 3 dB beamwidth of $\theta=70$ degrees and microphone B has a 3 dB beamwidth of $\phi=70$ degrees.

FIG. 5 shows the computer 27 having the microphones A, B mounted directly on the top thereof without the use of a pedestal. This results in the creation of a work area 37 in the vertical direction which merely surrounds the head of the user. Microphone A has a 3 dB beamwidth of $\theta=20$ degrees and microphone B has a 3 dB beamwidth of $\phi=20$ degrees.

FIG. 6 shows the computer 27 with its keyboard 28 and the microphone A, B mounted in front of the keyboard 28 and below the head of the user. The beam patterns of the microphones A, B are so designed that they extend upwardly and intersect the head of the user as shown in FIG. 6. Microphone A has a 3 dB beamwidth of $\theta=20$ degrees and microphone B and a 3 dB beamwidth of $\theta=20$ degrees.

One embodiment of the present invention contemplates the use of three microphones. Thus, as shown in FIG. 7, the computer 27 is provided and a first microphone A is mounted behind the keyboard 28, the second microphone B is mounted in front of the keyboard 28, and the third microphone C is mounted behind the user on the chair 30. The placement of the three microphones A, B and C and their beam patterns causes the work area 34 to be created which, as should be evident, completely surrounds the head of the user. Microphone A has a 3 dB beamwidth of $\theta=20$ degrees, microphone B has a 3 dB beamwidth of $\phi=20$ degrees, and microphone C has a 3 dB beamwidth of $\psi=90$ degrees.

FIG. 8 shows a block diagram of the present invention as embodied in a system having three microphones A, B and C. As seen in FIG. 8, the microphone A senses sounds which are fed to the preamplifier 41 while the preamplifier 43 received signals from the microphone B and preamplifier 44 receives signals from the microphone C. Signals are fed from the preamplifiers 41, 43 and 44 via variable amplifiers 91, 92 and 93 to a multiplexer 45, then to an analog-to-digital converter 47 whereupon the signals are fed through a microcomputer 49 which is preprogrammed to perform all the appropriate calculations and to modify the signals received thereby in a manner to be discussed in greater detail hereinafter. Thereafter, the modified signals are fed to a digital-to-analog converter 51, thence to an amplifier 53 and thereafter to a speaker or speakers 55.

The microcomputer 49, A/D converter 47 and multiplexer 45 can be a one-chip microcomputer such as the model 7811 made by NEC.

The block diagram shown in FIG. 8 is used if the system is to be used in a public announcement system (PA) or in a voice recognition system where speech synthesis output is wanted. If the system is only to be used for voice recognition purposes, the D/A converter 51, the amplifier 53 and the speaker 55 are not used.

Figure 9A:
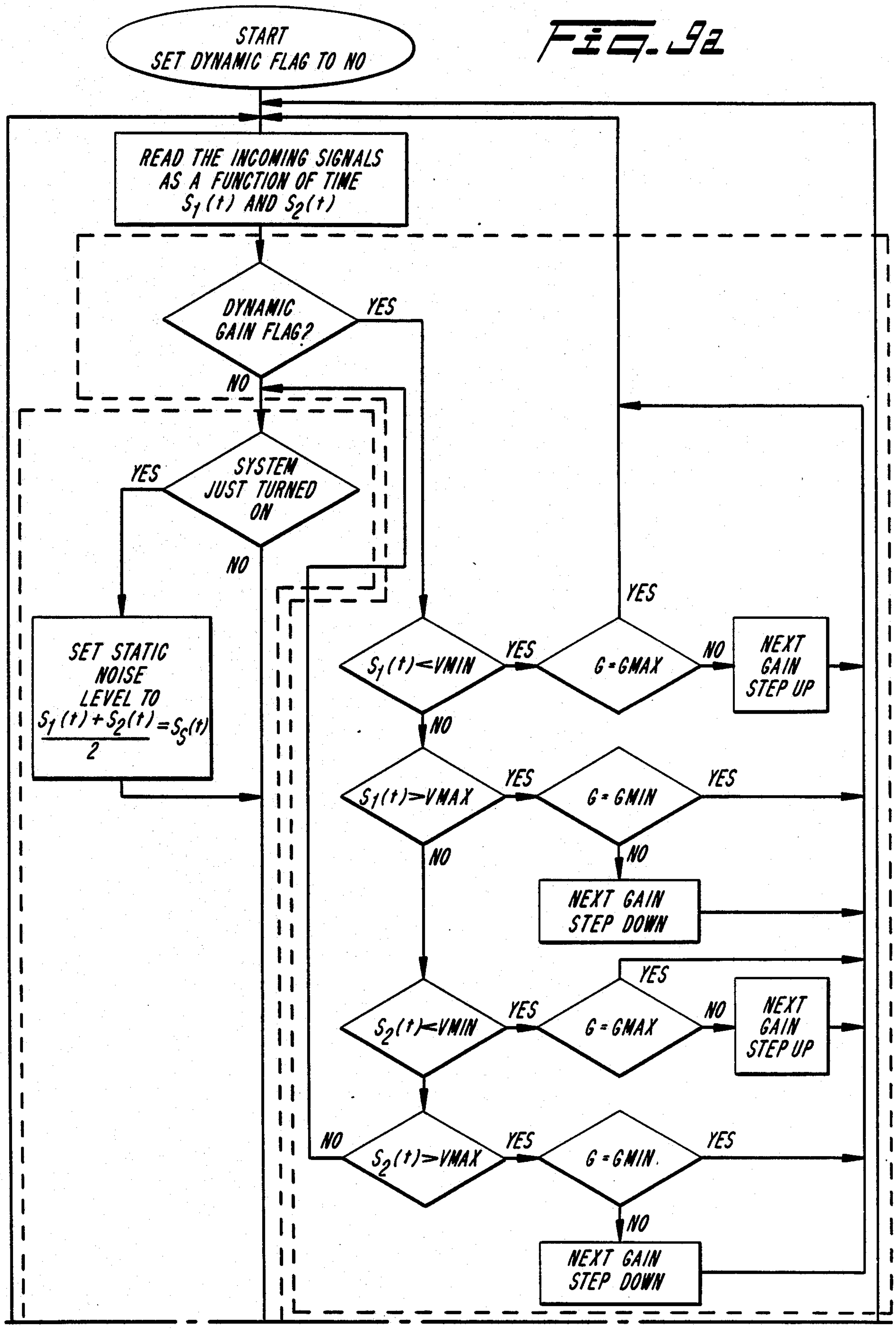
Figure 9B:
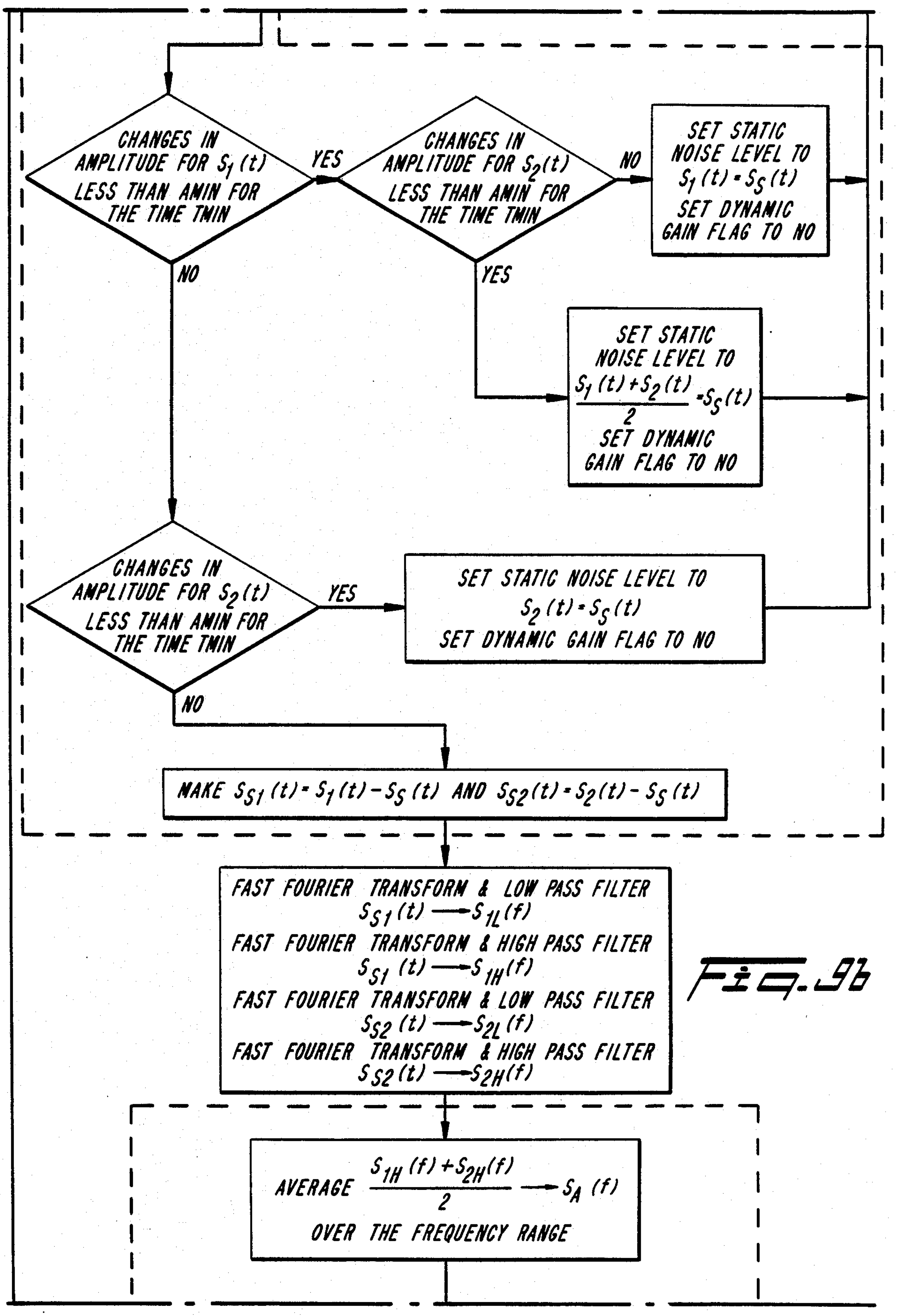
Figure 9C:
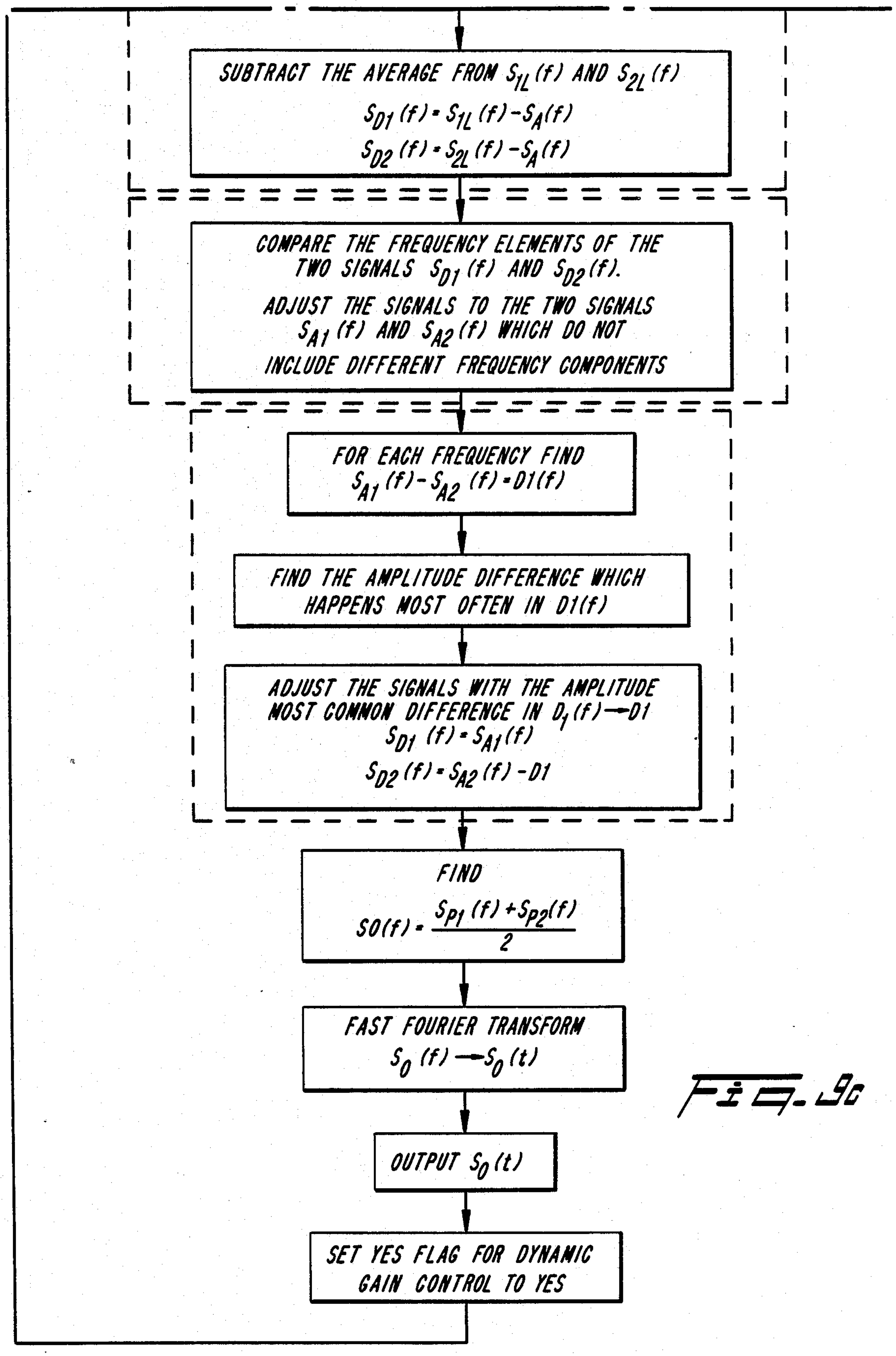
Figure 10A:
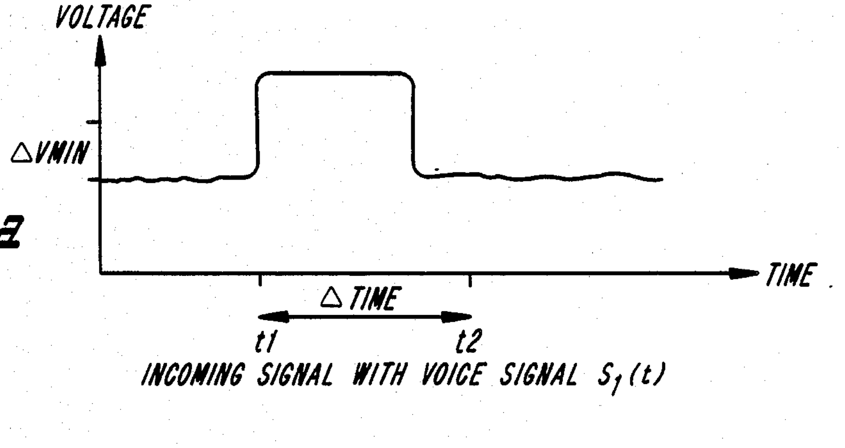
Figure 10B:
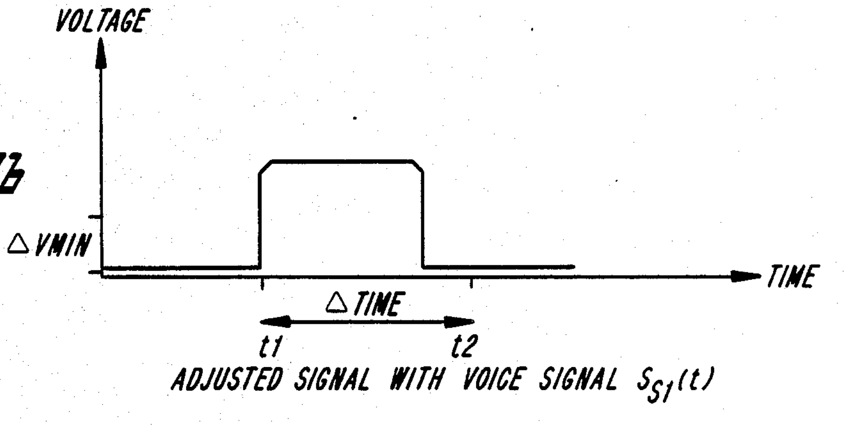
Figure 10C:
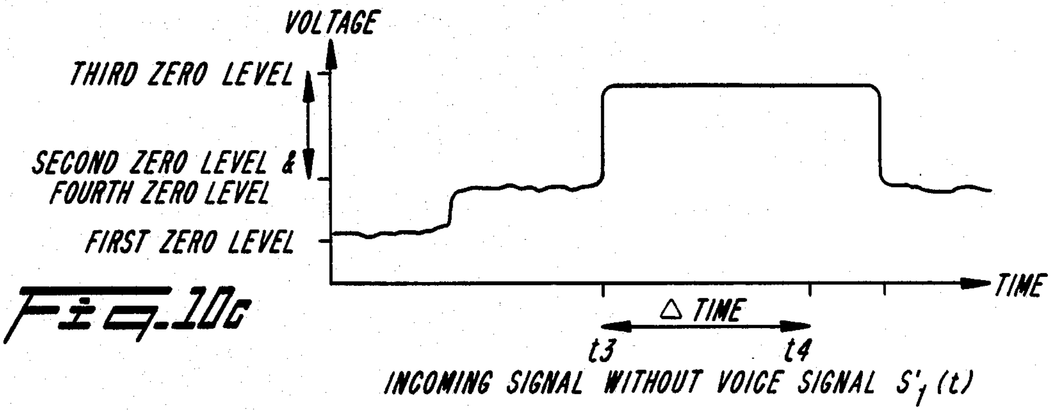
Figure 10D:
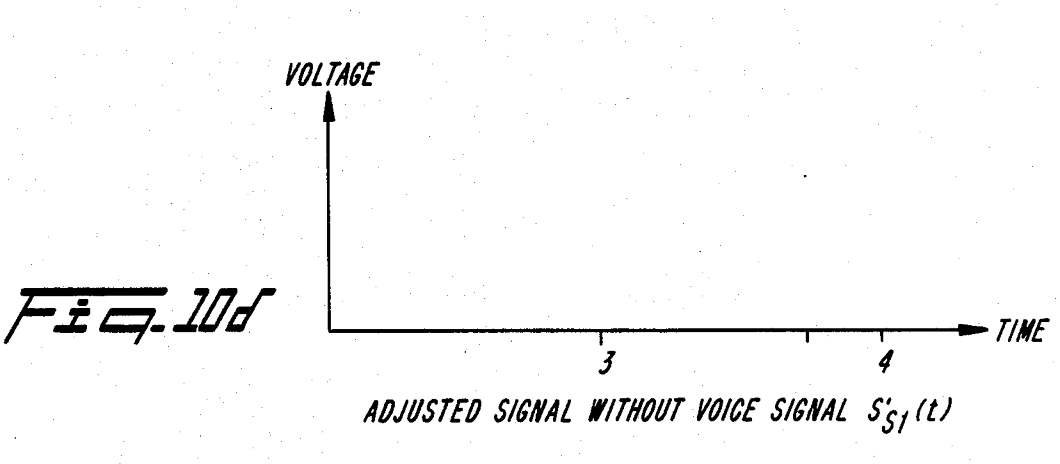

FIG. 9 shows the flowchart of the software routines, which is used to operate and control the electrical circuit in FIG. 8, when only two microphones A and B are used. The same processing which is done for the two signals from microphone A and B must also be done for the signal from microphone C. The averages in the processing scheme must, of course, also include the signal from microphone C. The flowchart includes five elements: (1) static noise cancellation which will be explained in conjunction with the graphs in FIG. 10; (2) dynamic noise cancellation which will be explained in conjunction with the graphs in FIG. 11; (3) area frequency component cancellation, which will be explained in conjunction with the graphs in FIG. 12; (4) phase adjustment after frequency component amplitude difference which will be explained in conjunction with the graphs in FIG. 13; and (5) dynamic gain control, which will be explained in conjunction with the electrical circuit shown in FIG. 8.

With reference to FIG. 10, in a further aspect of the present invention, the microcomputer 49 is preprogrammed so as to enable the cancellation of extraneous static noise. As should be evident with reference to FIG. 10, the system measures the received signal immediately after the system is turned on and sets this to a zero level. The system will only react if the received signal level is increased more than a preset level and then shifts back to level zero before a present maximum time. If the signal does not follow this pattern, then the system simply resets the static noise level. which will then be level zero, and the new reference level. Since this operation is conducted by taking sound measurements from at least two microphones to set the static noise level, the present invention is much more effective at cancelling static noise than those systems known in the prior art which usually only measure the signal received by one microphone. FIG. 10*a* shows a first incoming signal from microphone A, $S_1(t)$ and FIG. 10*b* shows the adjusted signal $S_{s1}(t)$. FIG. 10*c* shows a second incoming signal from microphone A, $S'_1(t)$ and the modified signal $S'_{sl}(t)$. A similar modification must, of course, also be done to the incoming signal from microphone B, and the modified signals are $S_{s1}(t)$ and $S_{s2}(t)$.

The Fourier transform serves as a bridge between the time domain and the frequency domain. It is possible to go back and forth between waveform and spectrum with enough speed and economy. The fast Fourier transform has revolutionized the digital processing of wave forms.

The Fourier transform for continuous signals can be written as:

$$S(f) = \int_{-\infty}^{\infty} S(t)e^{-i2\pi ft}\,dt$$

This transformation goes from the time domain S(t) to the frequency domain S(f). In order to go back from the frequency domain in the time domain the inverse Fourier transform is used.

$$S(t) = \int_{-\infty}^{\infty} S(f)e^{i2\pi ft}\,df$$

Since the signals are to be analyzed on a digital computer, the analogous discrete Fourier transform (DFT) is used. The discrete Fourier transform is $$S(f) = \frac{1}{N} \sum_{t=0}^{N-1} x(t)e^{i2\pi ft/N}$$

and the inverse discrete Fourier transform is $$S(t) = \frac{1}{N} \sum_{f=0}^{N-1} S(f)e^{i2\pi ft/N}$$

for $f = 0, 1, \ldots, N-1$ and $t = 0, 1 \ldots, N-1$.

for f=0, 1, . . . , N-1 and t=0, 1 . . . , N-1.

The fast Fourier transform (FFT) is simply an efficient method for computing the discrete Fourier transform.

When a digital filter is specified in the frequency domain, this is equivalent to multiplying the Fourier coefficients by a window function. This multiplication in the frequency domain is equivalent to performing a convolution in the time domain. Since all the manipulations in this application are made in the frequency domain, low pass and high pass filtering are done by simple window function multiplications of the Fourier coefficients.

The fast Fourier transformation is done here in the software in the microcomputer. It would, however, also be done by a dedicated chip like the model 2920 made by the Intel Corporation or the model TMS 32020 made by Texas Instruments.

Figure 11A:
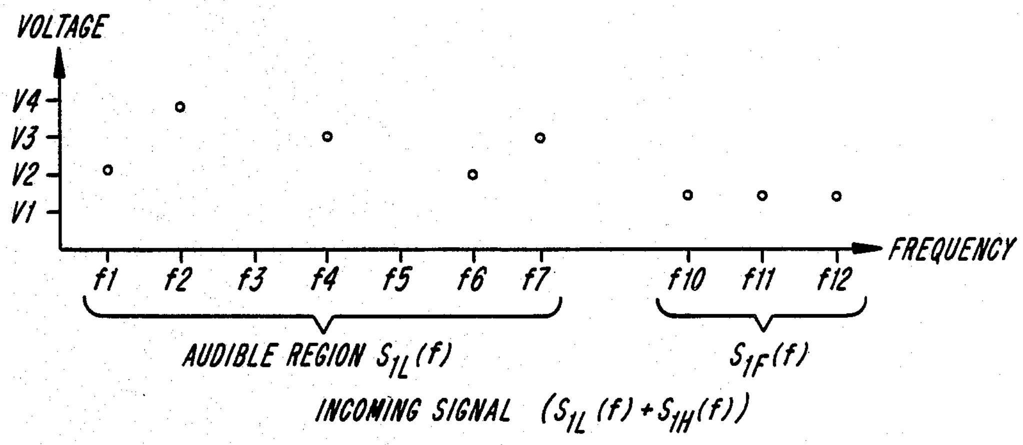
Figure 11B:
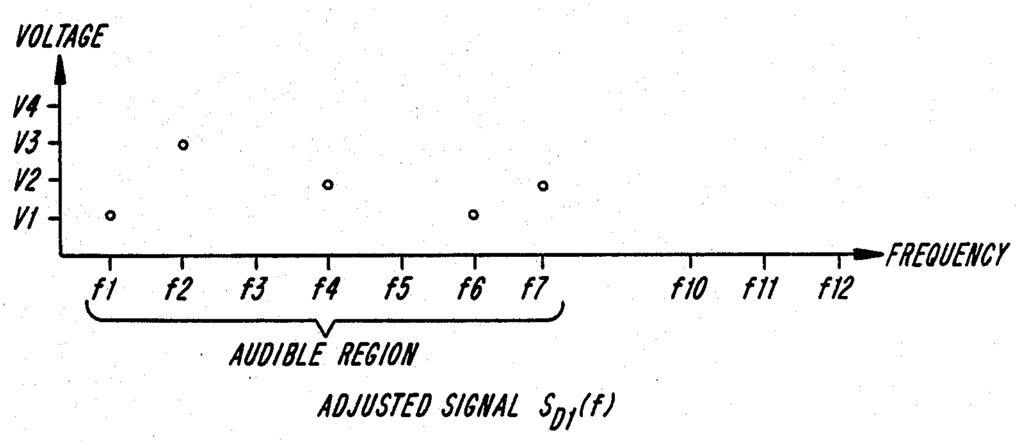

With reference now to FIGS. 11*a* and 11*b*, the dynamic noise cancellation scheme is explained: Figure 11*a* shows a graph of voltage versus frequency for an incoming signal and figure 11*b* shows a graph of voltage versus frequency for the same signal as adjusted through the use of a dynamic noise cancellation scheme in accordance with the present invention. The amplitude level of the signal in the frequency range outside the audible spectrum is found and used to adjust the amplitude level of the frequency components in the audible frequency range. The graphs show the signals for microphone A. The cancellation for microphone B is similar. The modified signals are $S_{D1}(f)$ and $S_{D2}(f)$. Since the present invention utilizes measurement from at least two microphones to find the signal level outside the audible frequency range, the dynamic noise cancellation achieved by the present invention is superior to that which is known in the prior art.

Figure 12A:
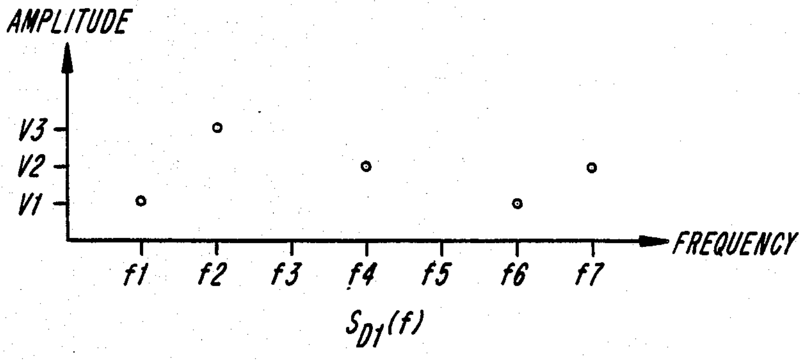
Figure 12B:
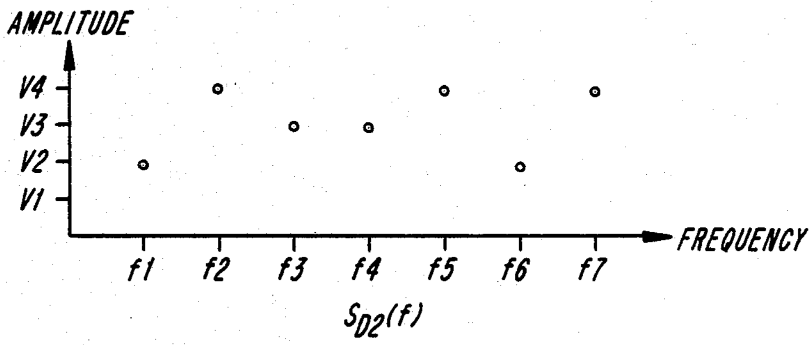
Figure 12C:
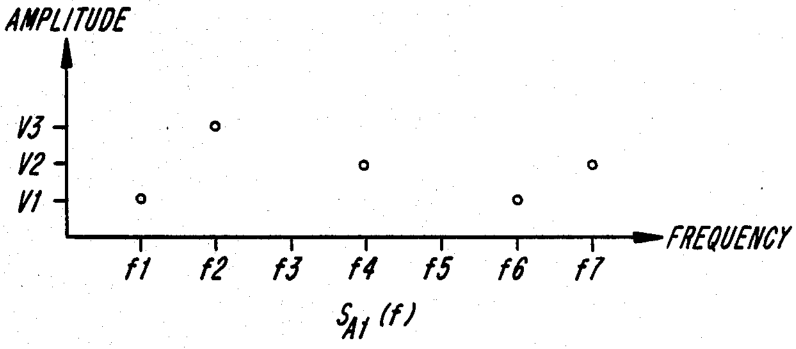
Figure 12D:
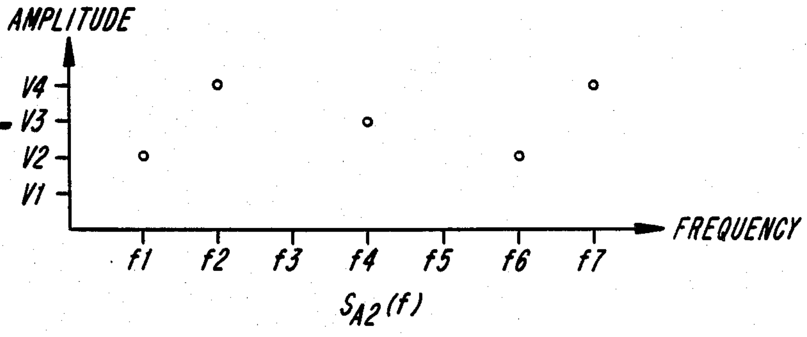

In carrying out the area cancellation technique, the microcomputer 49 is preprogrammed so that signal levels are compared for each frequency received thereby and the frequencies which are not present in both signals are cancelled from both signals. The graphs of FIG. 12 explain the results obtained when frequencies not present in both signals are cancelled from both signals. FIG. 12*a* and 12*b* show the two signals modified as described above. FIG. 12*c* and 12*d* show the two modified signals $S_{A1}(f)$ and $S_{A2}(f)$.

Figure 13A:
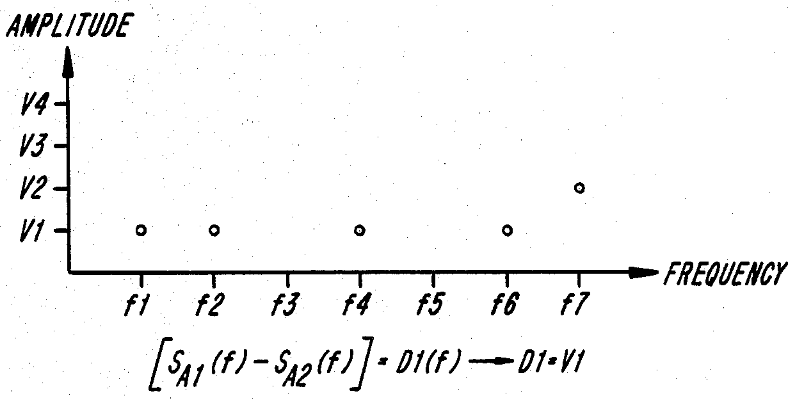
Figure 13B:
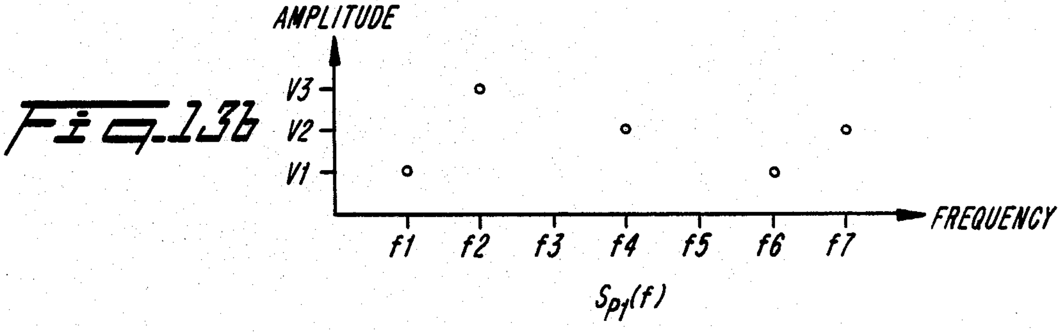
Figure 13C:
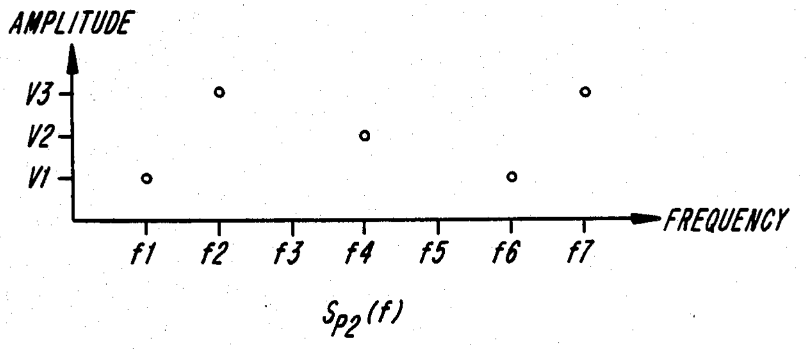

FIG. 13 shows examples of incoming and modified signals with the modifications resulting from adjustment of the incoming signals by the most common amplitude difference for each of the frequency components of the two signals. The results explained in FIG. 13 are obtained by programming the microcomputer 49 so as to carry out the amplitude difference sorting scheme explained with reference to FIG. 9. Figure 13*a* shows the difference between the two signals modified as described above. FIGS. 13*b* and 13*c* show the two modified signals $S_{p1}(f)$ and $S_{p2}(f)$.

The present invention also involves the programming of the microcomputer 49 so as to perform a technique known as "dynamic gain control". In this regard, reference is made to FIG. 9 which is a flow chart explaining the operation of this scheme. In the operation, the microcomputer looks at the signals coming out after the noise cancellation technique and the area cancellation techniques have been completed. Then, the gain is further adjusted so that the signal will be in a predetermined amplitude range to thereby enhance the signal-to-noise ratio. The computer 49 directly controls the gain in the variable amplifiers 91 and 92 in FIG. 8.

Accordingly, the present invention has been disclosed in terms of various embodiments and modifications thereof in a manner fulfilling each and every one of the objects of the invention as set forth hereinabove. It must be understood that various changes, modifications, and alterations in the teachings of the present invention may be contemplated by those skilled in the art without departing from the intended spirit and scope of the invention. Accordingly, it is intended that the present invention only be limited by the terms of the following claims.

I claim:

1. A system for cancelling unwanted sound and noise from outside a well defined area comprising:

(a) two directional microphones, each microphone being placed a distance away from a user and having a predetermined beam pattern;

(b) preamplifier means electrically connected to each microphone.

(c) multiplexer means connected to said preamplifier means for leading signals amplified by said preamplifier means into an A/D converter means;

(d) said A/D converter means supplying digital signals to a microcomputer;

(e) said microcomputer being programmed to subject said digital signals to fast Fourier transformation from a time domain to a frequency domain; and (f) said microcomputer being further programmed to cancel unwanted aspects of said digital signals.

2. The invention of claim 1, wherein the system further comprises:

(a) a third directional microphone placed a predetermined distance away from the user and having an overlapping beam pattern with respect to said two directional microphones;

(b) further preamplifier means electrically connected to said third microphone and to said multiplexer means and A/D converter means;

(c) said microcomputer being further programmed to subject digital signals received from said third microphone to said fast Fourier transformation and to cancel unwanted aspects of said digital signals.

3. The invention of claim 1, wherein the system further comprises:

(a) said microcomputer being programmed after said unwanted aspects have been cancelled to subject remaining signals to inverse fast Fourier transformation from said frequency domain to said time domain;

(b) D/A converter means enabling conversion of said remaining signals from digital signals into analog signals;

(c) amplifier means for amplifying said remaining signals in analog form to a predetermined level; and (d) speaker means for converting said remaining signals to sound waves.

4. The invention of claims 1, 2 or 3, wherein said area comprises overlapping portions of all of said beam patterns, said microcomputer being programmed to cancel static noise by setting a static noise level to an average amplitude of the signals upon activation of the system, the system then continuously measuring amplitude levels, and finding a new static noise level if changes in one or both signals are less than a predetermined amplitude level for a predetermined time, the signals being modified to a controlled static noise level by a simple subtraction.

5. The invention of claims 1, 2 or 3, wherein said area comprises overlapping portions of all of said beam patterns, said microcomputer being programmed to cancel dynamic noise, said system including a low pass and a high pass filter which are operative to manipulate the signals in said frequency domain by simple window function multiplication whereby signals subjected to said high pass filter are averaged and subtracted from signals subjected to said low pass filter.

6. The invention of claims 1, 2 or 3, wherein said area comprises overlapping portions of all of said beam patterns, said microcomputer being programmed for area cancellation of different frequency components, whereby signals are compared for each frequency component and are adjusted so that the frequencies which are not present in all signals are cancelled from all signals.

7. The invention of claim 5, wherein said microcomputer includes means for phase adjustment compensation of said signals in a frequency domain, by finding a most common absolute amplitude difference between the signals and compensating one of said signals with said difference.

8. The invention of claims 1, 2 or 3, wherein said area comprises overlapping portions of all of said beam patterns, said system further including control means for dynamically controlling gain of incoming signals by testing to see whether incoming amplitude should be adjusted up or down via setting of a variable amplifier operatively connected into said system.

* * * * *